(12) United States Patent
Yamaguchi et al.

(10) Patent No.: US 11,516,481 B2
(45) Date of Patent: Nov. 29, 2022

(54) VIDEO ENCODING METHOD AND VIDEO ENCODING DEVICE

(71) Applicant: SOCIONEXT INC., Kanagawa (JP)

(72) Inventors: Satoshi Yamaguchi, Yokohama (JP); Masao Kitagawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/198,045

(22) Filed: Mar. 10, 2021

(65) Prior Publication Data

US 2021/0195210 A1 Jun. 24, 2021

Related U.S. Application Data

(63) Continuation of application No. PCT/JP2018/034232, filed on Sep. 14, 2018.

(51) Int. Cl.
*H04N 19/159* (2014.01)
*H04N 19/109* (2014.01)
*H04N 19/127* (2014.01)
*H04N 19/156* (2014.01)

(52) U.S. Cl.
CPC ......... *H04N 19/159* (2014.11); *H04N 19/109* (2014.11); *H04N 19/127* (2014.11); *H04N 19/156* (2014.11)

(58) Field of Classification Search
CPC .. H04N 19/159; H04N 19/109; H04N 19/127; H04N 19/156; H04N 19/176; H04N 19/147; H04N 19/52; H04N 19/42; H04N 19/11
See application file for complete search history.

(56) References Cited

U.S. PATENT DOCUMENTS

| | | | | |
|---|---|---|---|---|
| 2004/0064746 | A1* | 4/2004 | Nishimoto | G06F 9/4403 713/323 |
| 2009/0296813 | A1* | 12/2009 | Garg | H04N 19/11 375/240.13 |
| 2010/0296580 | A1* | 11/2010 | Metoevi | H04N 19/107 375/E7.123 |

(Continued)

FOREIGN PATENT DOCUMENTS

| | | |
|---|---|---|
| JP | 2006-067213 A | 3/2006 |
| JP | 2015-035659 A | 2/2015 |

(Continued)

OTHER PUBLICATIONS

International Search Report end Written Opinion of the International Searching Authorogy dated Nov. 27, 2018 in International Patent Application No. PCT/JP2018/034232 with English translation.

(Continued)

*Primary Examiner* — Tracy Y. Li
(74) *Attorney, Agent, or Firm* — McDermott Will & Emery LLP

(57) ABSTRACT

A video encoding method includes a first mode selection step of selecting at least one mode as a first candidate mode from a predetermined first mode group for encoding a video, a second mode selection step of selecting one mode as an encoding mode from a predetermined second mode group, based on the selected first candidate mode, and an encoding step of encoding the video in the selected encoding mode.

14 Claims, 16 Drawing Sheets

(56) References Cited

U.S. PATENT DOCUMENTS

| | | | |
|---|---|---|---|
| 2011/0038414 A1* | 2/2011 | Song | H04N 19/70 |
| | | | 375/E7.243 |
| 2011/0176608 A1* | 7/2011 | Kim | H04N 19/593 |
| | | | 375/240.12 |
| 2012/0106636 A1* | 5/2012 | Kim | H04N 19/11 |
| | | | 375/E7.243 |
| 2013/0136178 A1 | 5/2013 | Sasai et al. | |
| 2013/0272401 A1* | 10/2013 | Seregin | H04N 19/593 |
| | | | 375/240.12 |
| 2014/0161172 A1 | 6/2014 | Wang et al. | |
| 2015/0043638 A1 | 2/2015 | Sato | |
| 2017/0041616 A1* | 2/2017 | Ramamurthy | H04N 19/11 |
| 2017/0251213 A1* | 8/2017 | Ye | H04N 19/176 |
| 2017/0324973 A1* | 11/2017 | Tanner | H04N 19/139 |
| 2018/0302629 A1 | 10/2018 | Kondo | |
| 2018/0338156 A1 | 11/2018 | Morigami et al. | |
| 2019/0037213 A1* | 1/2019 | Hermansson | H04N 19/107 |

FOREIGN PATENT DOCUMENTS

| | | |
|---|---|---|
| JP | 6223323 B2 | 11/2017 |
| WO | 2012/042860 A1 | 4/2012 |
| WO | 2013/172074 A1 | 11/2013 |
| WO | 2017/073362 A1 | 5/2017 |
| WO | 2017/094298 A1 | 6/2017 |

OTHER PUBLICATIONS

Tsukuba, T. et al., "Coding mode decision for MPEG-2 to H.264 Video transcoding," IEICE Technical Report, vol. 105, No. 463, Dec. 6, 2005, pp. 37-42, ISSN:0913-5685.

Japanese Office Action issued in corresponding Japanese Patent Application No. 2020-546655, dated Sep. 13, 2022, with English translation.

Takeshi Tsukuba et al., "Coding mode decision for MPEG-2 to H.264 video transcoding," IPSJ SIG Technical Reports, 2005, 12 pages, with English abstract; cited in OA of JP Application No. 2020-546655.

* cited by examiner

FIG. 3C
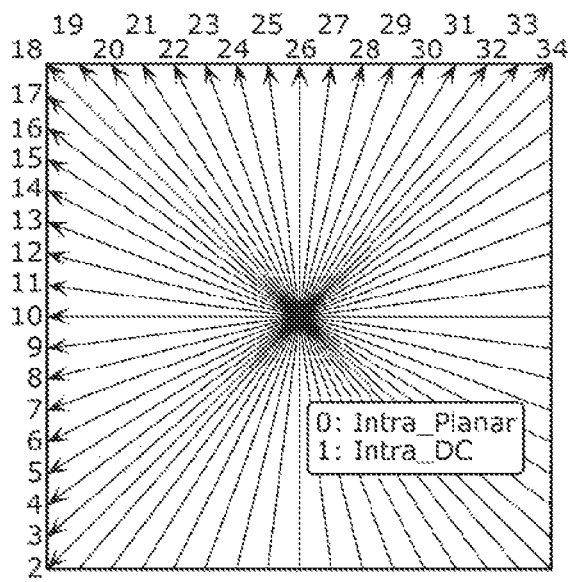
(a) Intra prediction mode directions (informative)
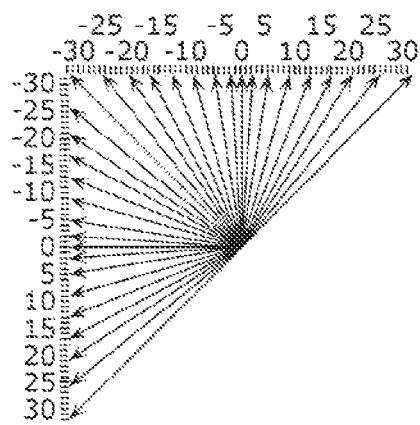
(b) Intra prediction angle direction (informative)
| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | - | 32 | 26 | 21 | 17 | 13 | 9 | 5 | 2 | 0 | -2 | -5 | -9 | -13 | -17 | -21 | -26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | -32 | -26 | -21 | -17 | -13 | -9 | -5 | -2 | 0 | 2 | 5 | 9 | 13 | 17 | 21 | 26 | 32 |
(c) Specification of intraPredAngle

FIG. 3F

| HEVC mode No. | AV1 Mode | AV1 Additional angle |
|---|---|---|
| 2 | D203 | +9 |
| 3 | D203 | +9 |
| 4 | D203 | +9 |
| 5 | D203 | +6 |
| 6 | D203 | 0 |
| 7 | D203 | -6 |
| 8 | D180 | +9 |
| 9 | D180 | +3 |
| 10 | D180 | 0 |
| 11 | D180 | -3 |
| 12 | D180 | -9 |
| 13 | D157 | +6 |
| 14 | D157 | +3 |
| 15 | D157 | -6 |
| 16 | D157 | -9 |
| 17 | D135 | +6 |
| 18 | D135 | 0 |
| 19 | D135 | -6 |
| 20 | D113 | +9 |
| 21 | D113 | +6 |
| 22 | D113 | 0 |
| 23 | D113 | -6 |
| 24 | D90 | +9 |
| 25 | D90 | +3 |
| 26 | D90 | 0 |
| 27 | D90 | -3 |
| 28 | D90 | -9 |
| 29 | D67 | +6 |
| 30 | D67 | 0 |
| 31 | D67 | -6 |
| 32 | D67 | -9 |
| 33 | D45 | +6 |
| 34 | D45 | 0 |

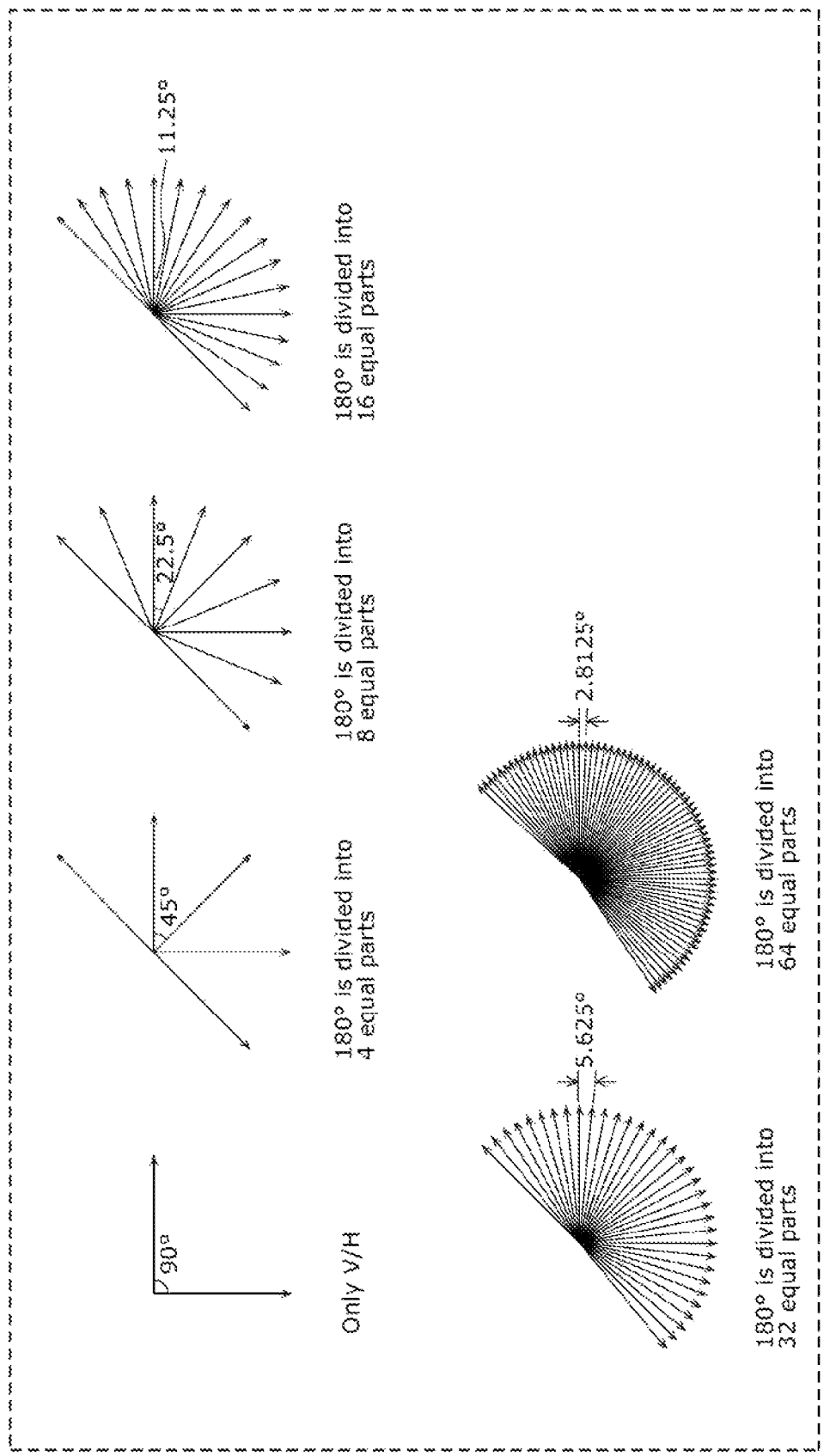

1/4 precision

1/8 precision

Candidate vector (first candidate mode 11b)

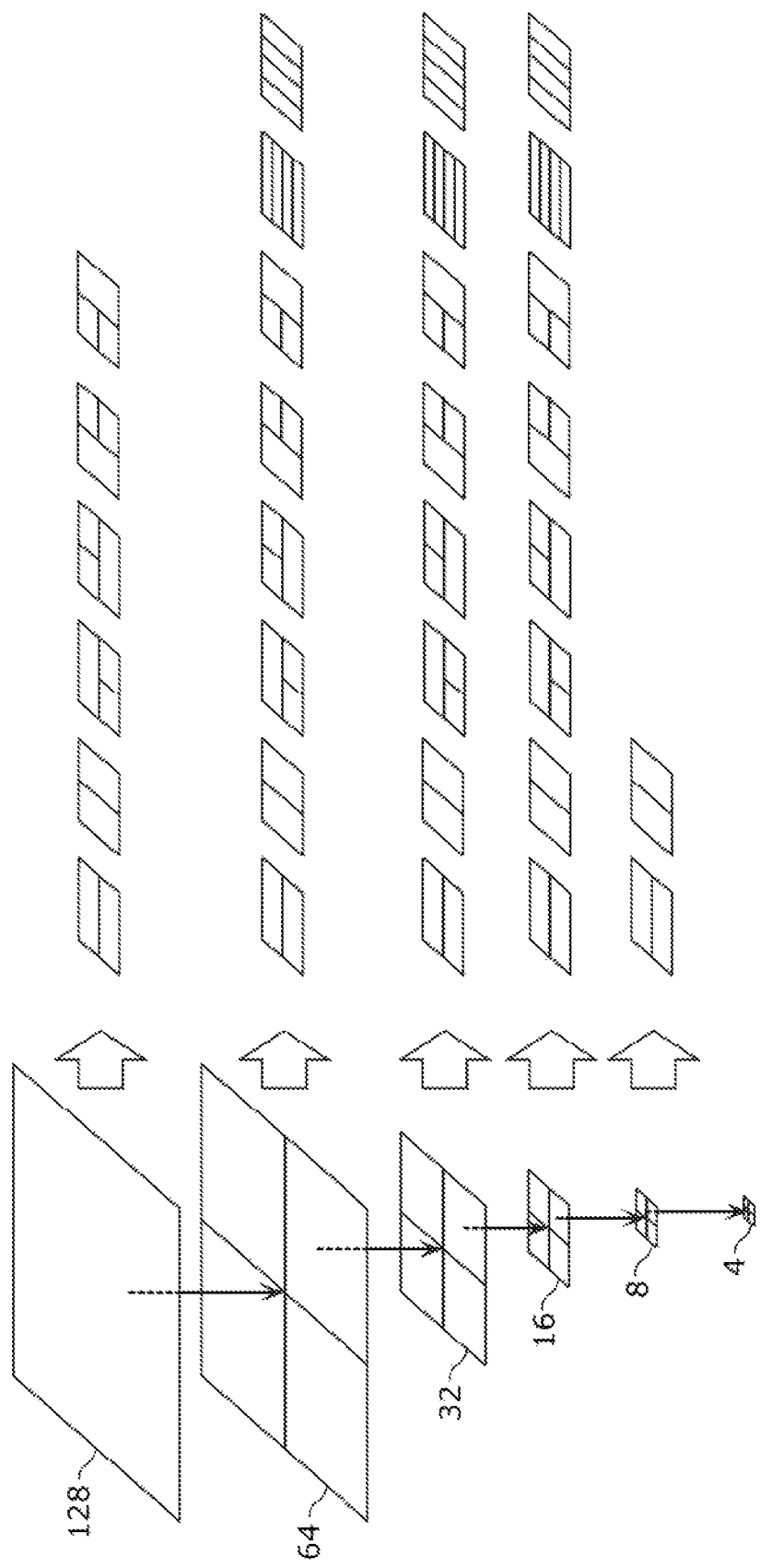

VIDEO ENCODING METHOD AND VIDEO ENCODING DEVICE

CROSS REFERENCE TO RELATED APPLICATION

This is a continuation application of PCT Patent Application No. PCT/JP2018/034232 filed on Sep. 14, 2018, designating the United States of America. The entire disclosure of the above-identified application, including the specification, drawings and claims is incorporated herein by reference in its entirety.

FIELD

The present disclosure relates to a video encoding method and a video encoding device, and particularly relates to a method of determining a mode in encoding of a video.

BACKGROUND

For video codecs, there are several standards such as MPEG-2, H.264, H.265, VP9, and AV1 (hereinafter, the standards for video codecs are also simply referred to as "codecs"). New standards may be further formulated in the future.

In such circumstances, the related art discloses a video encoding device which can encode videos in compliance with a plurality of standards in a common processing system (see PTL 1, for example).

In the video encoding device disclosed in PTL 1, a plurality of hardware components (i.e., dedicated electronic circuits) corresponding to a plurality of standards is incorporated therein to selectively operate one of the hardware components according to the standard.

CITATION LIST

Patent Literature

PTL 1: Japanese Patent No. 6223323

SUMMARY

Technical Problem

However, the hardware components should be remodeled when the video encoding device disclosed in PTL 1 needs to be compliant with a standard with which it is not compliant, for example, when it should be compliant with a new standard. Such remodeling leads to enormous cost and time.

Thus, an object of the present disclosure is to provide a video encoding method and the video encoding device which can be remodeled in reduced amounts of cost and time compared to those in the related art to be compliant with a new standard with which the video encoding device is not compliant yet, as needed.

Solution to Problem

To achieve the above object, the video encoding method according to one embodiment of the present disclosure includes (A) selecting at least one mode as a first candidate mode from a predetermined first mode group for encoding a video; (B) selecting one mode as an encoding mode from a predetermined second mode group, based on the first candidate mode selected; and (C) encoding the video in the encoding mode selected.

To achieve the above object, the video encoding device according to one embodiment of the present disclosure includes a first mode selector which selects at least one mode as a first candidate mode from a predetermined first mode group for encoding a video; a second mode selector which selects one mode as an encoding mode from a predetermined second mode group, based on the first candidate mode selected; and an encoder which encodes the video in the encoding mode selected.

Advantageous Effects

The present disclosure implements a video encoding method and a video encoding device which can be remodeled in reduced amounts of cost and time compared to those in the related art to be compliant with a new standard with which the video encoding device is not compliant yet, as needed.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3C is a diagram illustrating the type of mode for intra prediction in H.265.

FIG. 3F is a diagram illustrating the correspondence between 30 the mode for intra prediction selected by the first mode selector and the mode for intra prediction in AV1 having a direction closest to that of the mode for intra prediction selected by the first mode selector.

FIG. 3G is a diagram illustrating other examples (six examples) 35 of the first mode group included in the first mode selector in the video encoding device according to the embodiment.

FIG. 9C is a diagram illustrating the size of the encoding block in AV1.

DESCRIPTION OF EMBODIMENT

Figure 1:
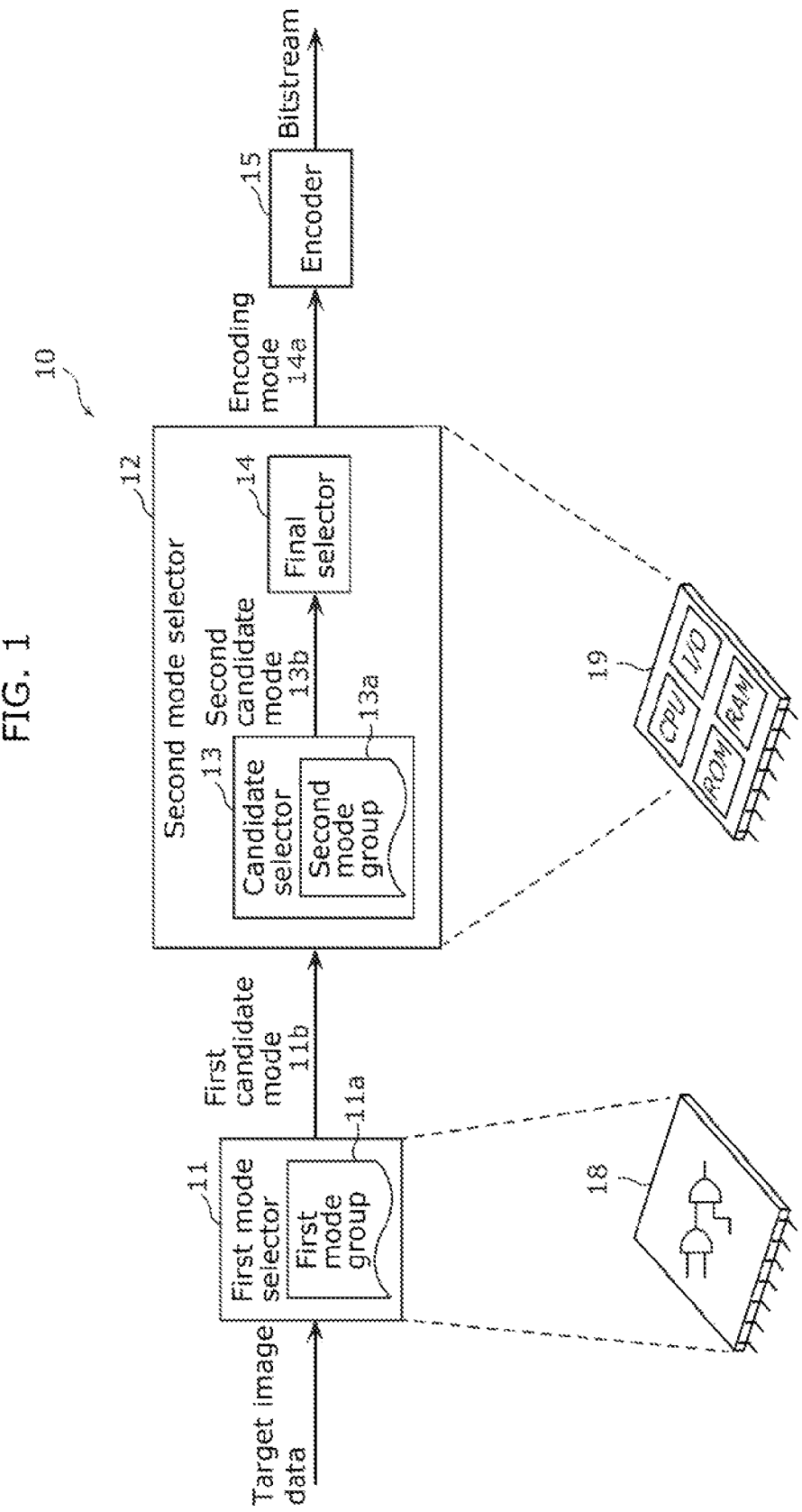
FIG. 1 is a block diagram illustrating a configuration of the video encoding device according to an embodiment.

An embodiment and Examples according to the present disclosure will now be described with reference to the drawings. The embodiment and Examples described below all illustrate specific examples of the present disclosure. Numeric values, shapes, materials, standards, components, arrangement positions of the components, connection forms thereof, steps, and the order of the steps shown in the embodiment and Examples described below are exemplary, and should not be construed as limitations to the present disclosure. Among the components described in the embodiment and Examples below, the components not described in an independent claim representing the most superordinate concept of the present disclosure are described as arbitrary components. Moreover, the drawings are not always strictly drawn. In the drawings, identical referential numerals will be given to substantially identical configurations, and duplication of the description thereof will be omitted or simplified in some cases.

Embodiment

FIG. 1 is a block diagram illustrating a configuration of video encoding device 10 according to an embodiment. Video encoding device 10 is an encoder for videos which has an architecture which can reduce the cost and time needed to remodel the video encoding device to be compliant with a new standard. As functional blocks, video encoding device 10 includes first mode selector 11, second mode selector 12, and encoder 15.

First mode selector 11 is a processing unit which selects at least one mode as first candidate mode 11b from predetermined first mode group 11a for encoding a video, and is implemented as first electronic circuit 18 not including a processor (e.g., a single chip semiconductor integrated circuit such as a gate array). Here, the mode refers to a specific processing method in a variety of processings in encoding of the video, and includes a mode for intra prediction (i.e., a method of processing a predicted image in intra prediction), a mode for motion prediction (i.e., the reference image and the reference direction), and a mode for the size of the encoding block (i.e., the encoding block size). First mode group 11a is a collection of modes defined by a first standard (such as H.265), for example, modes for intra prediction.

More specifically, for the target image data, first mode selector 11 selects first candidate mode 11b by calculating costs of the modes included in first mode group 11a, and preferentially selecting a mode having a smaller value of cost obtained in the calculation.

Second mode selector 12 is a processing unit which selects one mode as encoding mode 14a from predetermined second mode group 13a, based on first candidate mode 11b selected by first mode selector 11. Second mode selector 12 together with encoder 15 is implemented by second electronic circuit 19 including a processor (such as a single chip semiconductor integrated circuit including a CPU, a ROM which stores programs, a RAM, and an input/output (I/O) circuit). Second mode group 13a is a mode group (such as modes for intra prediction) defined by a second standard (such as AV1) different from the first standard corresponding to first mode group 11a. Accordingly, first mode group 11a includes the modes which do not belong to second mode group 13a. Compared between first mode group 11a and second mode group 13a, typically, the number of modes included in first mode group 11a is smaller than that of modes included in second mode group 13a. This is because the entire processing load is reduced by avoiding calculation of costs for all the modes in second mode group 13a by performing two-stage processing of general mode selection by first mode selector 11 and specific mode selection by second mode selector 12 depending on the mode selection by first mode selector 11. In the present embodiment, second electronic circuit 19 is mounted on a semiconductor substrate different from that of first electronic circuit 18.

More specifically, second mode selector 12 includes candidate selector 13 and final selector 14. Candidate selector 13 selects at least one mode (typically, two or more modes) from second mode group 13a as second candidate mode 13b, based on first candidate mode 11b selected by first mode selector 11. Specifically, candidate selector 13 selects second candidate mode 13b from second mode group 13a by selecting at least a mode close to first candidate mode 11b selected by first mode selector 11.

Final selector 14 selects one final encoding mode 14a from second candidate mode 13b selected by candidate selector 13. Specifically, final selector 14 selects encoding mode 14a by calculating costs of the modes included in second candidate mode 13b selected by candidate selector 13, and preferentially selecting a mode having a smaller value of cost obtained in the calculation.

Encoder 15 is a processing unit which encodes a video in encoding mode 14a selected by second mode selector 12. Encoder 15 together with second mode selector 12 is implemented by second electronic circuit 19 including a processor. More specifically, encoder 15 performs orthogonal transformation and quantization, and then entropy encoding on the target image data, and outputs the obtained data as a bitstream. Furthermore, encoder 15 obtains a reference image by subjecting the image data after orthogonal transformation and quantization to inverse quantization and inverse orthogonal transformation, followed by processing by a loop filter, such as deblocking, and stores the resulting reference image in an internal frame memory. The reference image stored in the frame memory is used in the case where a predicted image obtained by subjecting the reference image to motion compensation is subtracted from the target image data before orthogonal transformation and quantization or in the case where the image data subjected to inverse quantization and inverse orthogonal transformation is added before the processing by the loop filter.

The operation of video encoding device 10 according to the present embodiment having such a configuration will now be described.

Figure 2:
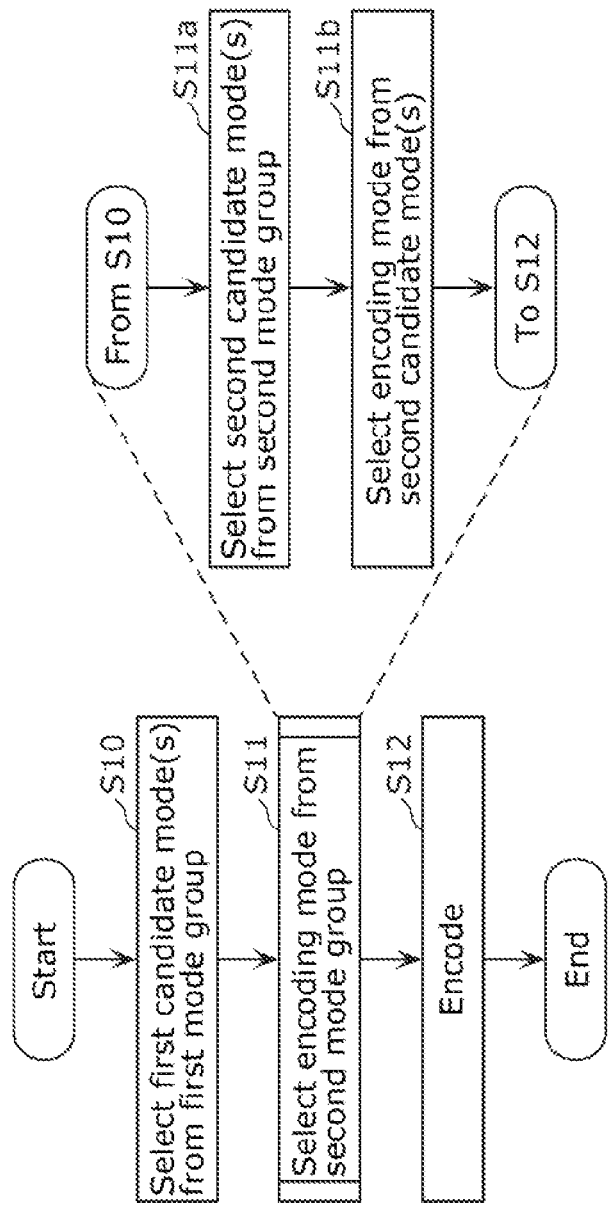
FIG. 2 is a flowchart illustrating the operation of the video encoding device according to an embodiment.

FIG. 2 is a flowchart illustrating the operation of video encoding device 10 according to the present embodiment (that is, the video encoding method).

Initially, first mode selector 11 selects at least one mode as first candidate mode 11b from predetermined first mode group 11a for encoding a video (first mode selection step S10). More specifically, for the target image data, first mode selector 11 selects first candidate mode 11b by calculating the costs of the modes included in first mode group 11a, and preferentially selecting a mode having a smaller value of cost obtained in the calculation.

Next, based on first candidate mode 11b selected by first mode selector 11, second mode selector 12 selects one mode as encoding mode 14a from predetermined second mode group 13a (second mode selection step S11).

More specifically, in second mode selection step S11, candidate selector 13 selects at least one mode (typically, two or more modes) as second candidate mode 13b from second mode group 13a, based on first candidate mode 11b selected by first mode selector 11 (candidate selection step S11a). Specifically, candidate selector 13 selects second candidate mode 13b from second mode group 13a by selecting at least a mode close to first candidate mode 11b selected by first mode selector 11. Subsequently, final selector 14 selects one final encoding mode 14a from second candidate mode 13b selected by candidate selector 13 (final selection step S11b). Specifically, final selector 14 selects encoding mode 14a by calculating costs of the modes included in second candidate mode 13b selected by candidate selector 13, and preferentially selecting a mode having a smaller value of cost obtained in the calculation.

Finally, encoder 15 encodes the video in encoding mode 14a selected by second mode selector 12 (encoding step S12). More specifically, encoder 15 performs orthogonal transformation and quantization, and then the entropy encoding on the target image data, and outputs the obtained data as a bitstream.

As described above, video encoding device 10 according to the present embodiment includes first mode selector 11 which selects at least one mode as first candidate mode 11b from predetermined first mode group 11a for encoding a video, second mode selector 12 which selects one mode as encoding mode 14a from predetermined second mode group 13a, based on first candidate mode 11b selected, and encoder 15 which encodes the video in encoding mode 14a.

Moreover, the video encoding method according to the present embodiment includes first mode selection step S10 of selecting at least one mode as first candidate mode 11b from predetermined first mode group 11a for encoding a video, second mode selection step S11 of selecting one mode as encoding mode 14a from predetermined second mode group 13a, based on first candidate mode 11b selected, and encoding step S12 of encoding the video in encoding mode 14a selected.

In such a configuration, the process of determining the mode in encoding is separated into two. For this reason, the configuration including first mode group 11a which is a collection of typical modes not depending on the target standard and second mode group 13a which is a collection of modes compliant with the target standard, for example, can provide a video encoding device and a video encoding method compliant with a new standard, as needed, only by remodeling the part thereof (the hardware or the software) related with selection from second mode group 13a. Thus, compared to the configuration in the related art where all the steps related to the determination of the mode should be remodeled, video encoding device 10 can be remodeled in reduced amounts of cost and time to be compliant with a new standard.

Here, first mode selector 11 is first electronic circuit 18 not including a processor, and second mode selector 12 is second electronic circuit 19 including a processor. In other words, first mode selection step S10 is executed by first electronic circuit 18 not including a processor, and second mode selection step S11 is executed by second electronic circuit 19 including a processor.

Because first mode group 11a is included as a collection of typical modes not depending on the target standard and second mode group 13a is included as a collection of modes compliant with the target standard, such a configuration can provide a video encoding method compliant with a new standard, as needed, only by remodeling the part thereof (i.e., the software) related with selection from second mode group 13a. Thus, compared to the configuration in the related art where the hardware should be remodeled, video encoding device 10 can be remodeled in reduced cost and time to be compliant with a new standard.

First electronic circuit 18 and second electronic circuit 19 are mounted on different semiconductor substrates. In such a configuration, the hardware related with the selection from first mode group 11a and the software related with the selection from second mode group 13a are mounted on different semiconductor chips. For this reason, modification of the software can be achieved only by modifying part of the semiconductor chip including the software.

Second mode selection step S11 further includes candidate selection step S11a of selecting at least one mode as second candidate mode 13b from second mode group 13a, based on first candidate mode 11b selected in first mode selection step S10, and final selection step S11b of selecting encoding mode 14a from second candidate mode 13b selected in candidate selection step S11a.

In such a configuration, encoding mode 14a is selected from second candidate mode 13b. Thus, the final encoding mode 14a can be determined without evaluating all the modes included in second mode group 13a, resulting in high-speed determination of the mode.

In first mode selection step S10, first candidate mode 11b is selected by calculating the costs of the modes included in first mode group 11a, and preferentially selecting a mode having a smaller value of cost obtained in the calculation. In candidate selection step S11a, second candidate mode 13b is selected by selecting at least a mode close to first candidate mode 11b, which is selected in first mode selection step S10, from second mode group 13a. In final selection step S11b, encoding mode 14a is selected by calculating the costs of the modes included in second candidate mode 13b selected in candidate selection step S11a, and preferentially selecting a mode having a smaller value of cost obtained in the calculation.

In such a configuration, the calculation of costs of all the modes included in second mode group 13a is avoided even when second mode group 13a is compliant with the target standard, resulting in high-speed determination of the mode.

First mode group 11a is a mode group defined by a first standard, and second mode group 13a is a mode group which is defined by a second standard different from the first standard. In such a configuration, the second standard is defined as the target standard for video encoding device 10. Thereby, video encoding device 10 can be made compliant with a new standard by remodeling the part thereof (the hardware or the software) related with the selection from second mode group 13a.

The number of modes included in first mode group 11a is smaller than that of modes included in second mode group 13a. In determination of the mode in such a configuration, for example, modes can be generally selected in a first stage, and can be specifically selected in a second stage using the result in the first stage. Such determination of the mode can reduce the processing load compared to the case where all the modes included in second mode group 13a are evaluated to select encoding mode 14a.

First mode group 11a includes modes which do not belong to second mode group 13a. In determination of the mode in such a configuration, for example, modes can be generally selected in a first stage, and can be specifically selected in a second stage using the result in the first stage. Such determination of the mode can reduce the processing load compared to the case where all the modes included in second mode group 13a are evaluated to select encoding mode 14a.

Although first electronic circuit 18 which executes first mode selection step S10 is implemented by hardware (i.e., a dedicated electronic circuit not including a processor) and second electronic circuit 19 which executes second mode selection step S11 is implemented by software (i.e., a general electronic circuit including a processor) in the embodiment above, any other configuration can be used. Both of first mode selection step S10 and second mode selection step S11 may be implemented by hardware, or may be implemented by software. Any one of these forms can have a merit that the entire processing load is reduced by performing two-stage processing of the general mode selection and the specific mode selection depending on the result thereof to avoid calculation of the costs of all the modes included in second mode group 13a, and another merit that only part (hardware or software) related with the selection from second mode group 13a can be remodeled to be compliant with a new standard, as needed, by providing first mode group 11a as a collection of typical modes not depending on the target standard and second mode group 13a as a collection of modes compliant with the target standard.

Although first electronic circuit 18 and second electronic circuit 19 are mounted on different semiconductor substrates in the embodiment above, any other configuration can be used. First electronic circuit 18 and second electronic circuit 19 may be mounted on the same semiconductor substrate. Even in such a case, the part (software) related with the selection from second mode group 13a can be remodeled to be compliant with a new standard, as needed, by providing first mode group 11a as a collection of typical modes not depending on the target standard and second mode group 13a as a collection of modes compliant with the target standard.

Although second mode selector 12 and encoder 15 are implemented by a common electronic circuit (i.e., second electronic circuit 19) in the embodiment above, any other configuration can be used. Second mode selector 12 and encoder 15 may be implemented by independent electronic circuits. In such a case, when the processing of encoder 15 is not changed, only the electronic circuit including second mode selector 12 can be remodeled to be compliant with a new standard, as needed.

Although first mode group 11a is a mode group defined by the first standard in the embodiment above, first mode group 11a may be any other mode group. For example, first mode group 11a may be part (i.e., a subset) of second mode group 13a compliant with the second standard, rather than a mode group compliant with the standard. Even in such a case, the following merits can be obtained: the entire processing load is reduced by performing two-stage processing of the general mode selection and the specific mode selection depending on the result thereof to avoid calculation of the costs of all the modes included in second mode group 13a; and only part (hardware or software) related with the selection from second mode group 13a can be remodeled to be compliant with a new standard, as needed, by providing second mode group 13a as a collection of modes compliant with the target standard.

Example 1

Next, as an example, Example 1 of the embodiment above will be described, in which video encoding device 10 and the video encoding method according to the embodiment above are used in determination of the mode for intra prediction.

The intra prediction refers to the intra prediction processing, and is a technique of significantly improving encoding efficiency of intra encoding blocks by generating a predicted image from pixels adjacent to an encoding block and delta encoding the image.

Figure 3A:
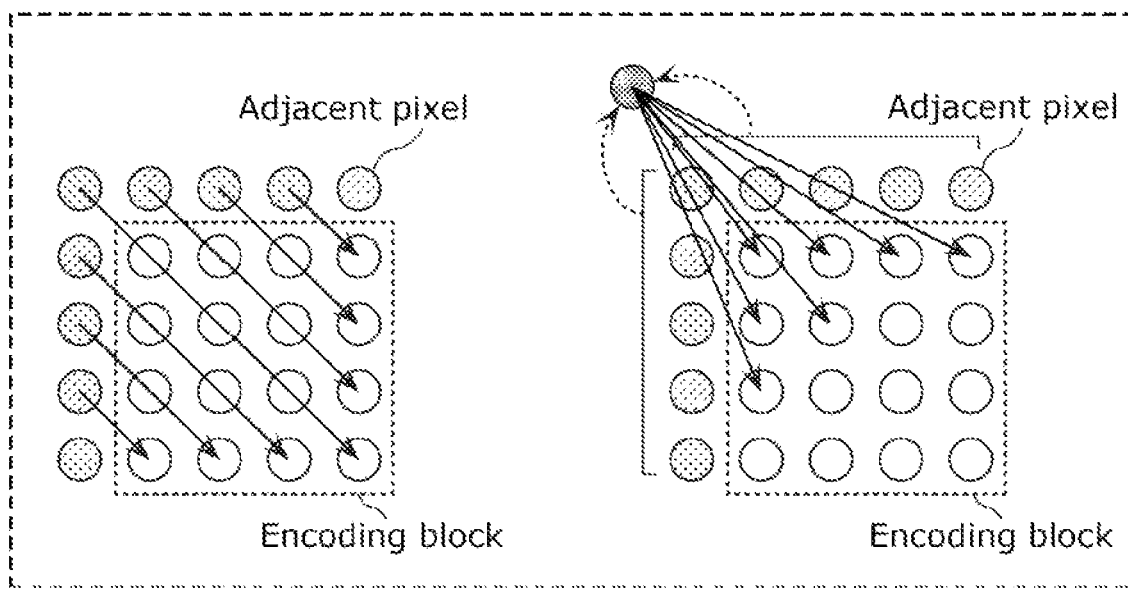
FIG. 3A is a diagram illustrating a mode for intra prediction in encoding of a video.

FIG. 3A is a diagram illustrating a mode for intra prediction (hereinafter, also referred to as "prediction direction") in encoding of a video. As illustrated in the diagram, the mode for intra prediction has variations, and includes a mode for intra prediction having a direction to generate a predicted image, based on an adjacent pixel located in a 45° or 90° direction and a mode for intra prediction with no direction for generating an average of adjacent pixels as a predicted image.

Figure 3B:
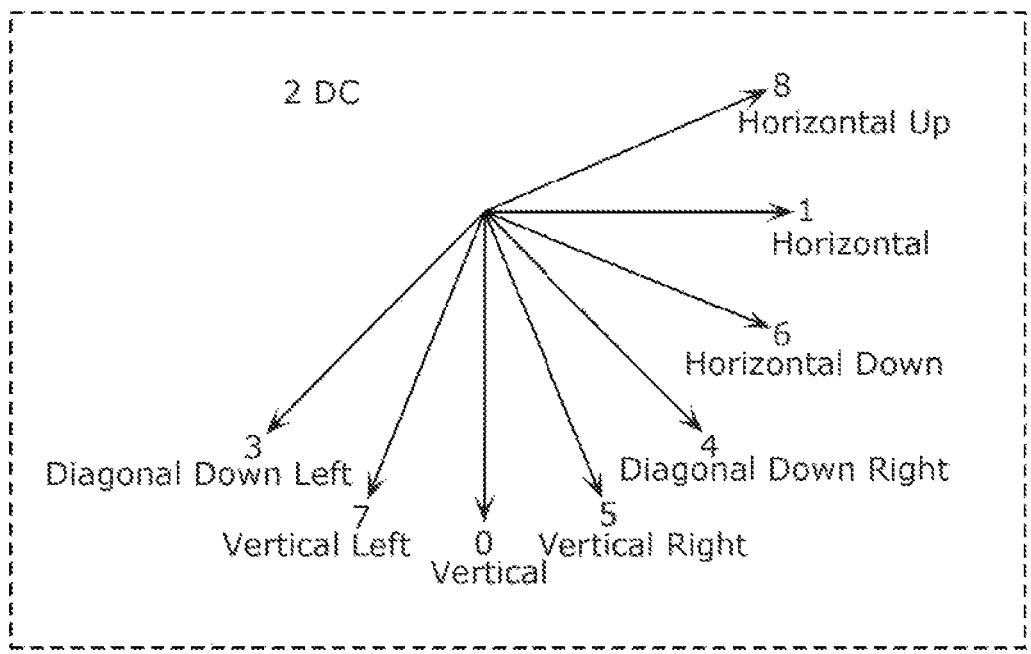
FIG. 3B is a diagram illustrating the type of the mode for intra prediction in H.264.
Figure 3D:
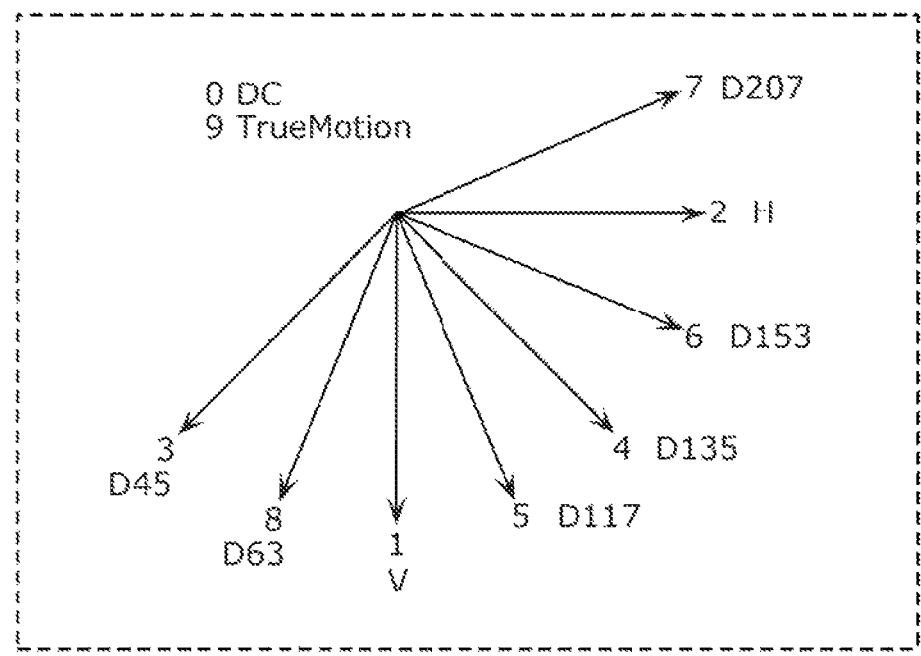
FIG. 3D is a diagram illustrating the type of mode for intra prediction in VP9.
Figure 3E:
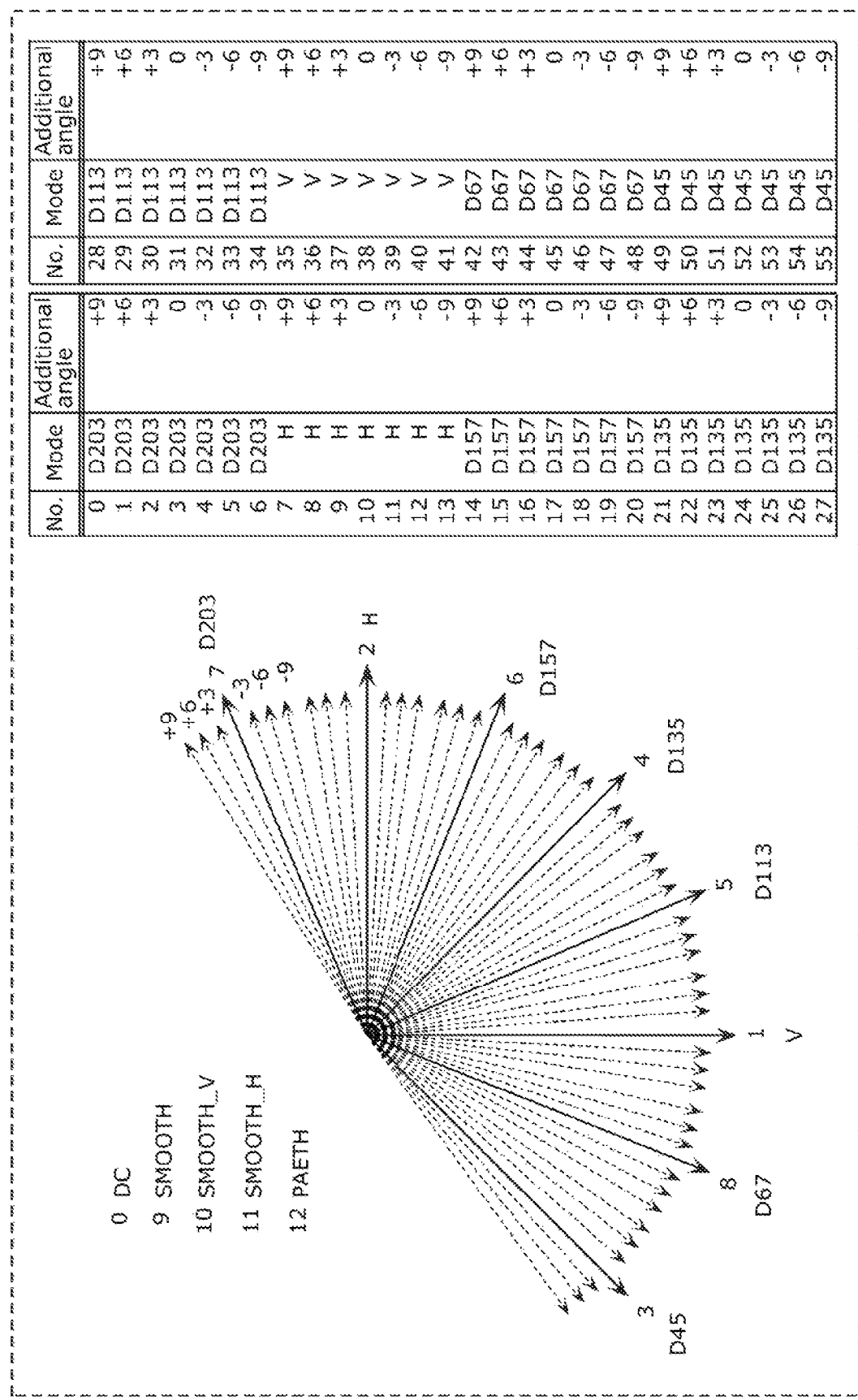
FIG. 3E is a diagram illustrating the type of mode for intra prediction in AV1.

The type of the mode for intra prediction (i.e., the mode group) varies according to the codec (i.e., the standard). FIG. 3B is a diagram illustrating the type of the mode for intra prediction in H.264. As illustrated in the diagram, in H.264, there are eight modes for intra prediction each having a direction and one mode for intra prediction with no direction. FIG. 3C is a diagram illustrating the type of mode for intra prediction in H.265. (a) of FIG. 3C represents the prediction directions of numbers 0 to 34 in the mode for intra prediction in H.265. (b) of FIG. 3C represents the definitions of the angles for the prediction directions of the modes in the intra prediction in H.265. (c) of FIG. 3C represents the correspondence between the mode No. and the definition of the angle in the intra prediction in H.265. As illustrated in FIG. 3C, in H.265, there are 33 modes for intra prediction each having a direction (mode Nos. 2 to 34) and two modes for intra prediction with no direction (mode No. 0 (Planar) and mode No. 1 (DC)). FIG. 3D is a diagram illustrating the type of mode for intra prediction in VP9. As illustrated in the diagram, in VP9, there are eight modes for intra prediction each having a direction and two modes for intra prediction with no direction. FIG. 3E is a diagram illustrating the type of mode for intra prediction in AV1. As illustrated in the diagram, in AV1, there are 56 modes at the maximum for intra prediction having a direction and five modes for intra prediction with no direction. These codecs have different numbers of directions and different angles. Even if a mode of the same angle is present, filter calculation during generation of the predicted image is different among these codecs. Thus, the generated predicted images are different among the codecs. However, the codecs share the idea that a predicted image is generated from adjacent pixels according to the direction.

In Example 1, focused on this shared feature, the determination of the mode for intra prediction is divided and processed in two stages by first mode selector 11 and second mode selector 12 (strictly, three stages by first mode selector 11, candidate selector 13, and final selector 14).

Although the processing of first mode group 11a may be any processing to search for a prediction method for generating a predicted image from adjacent pixels according to a direction, for easiness in understanding, the processing will be described by way of an example of a processing content actually present. Here, 33 modes for intra prediction each having a direction, which are defined by H.265, are used as first mode group 11a, and 56 modes for intra prediction each having a direction, which are defined by AV1, are used as second mode group 13a. In other words, first mode selector 11 has a function to select a mode for intra prediction defined by H.265, and second mode selector 12 has a function to select a mode for intra prediction defined by AV1.

Figure 4:
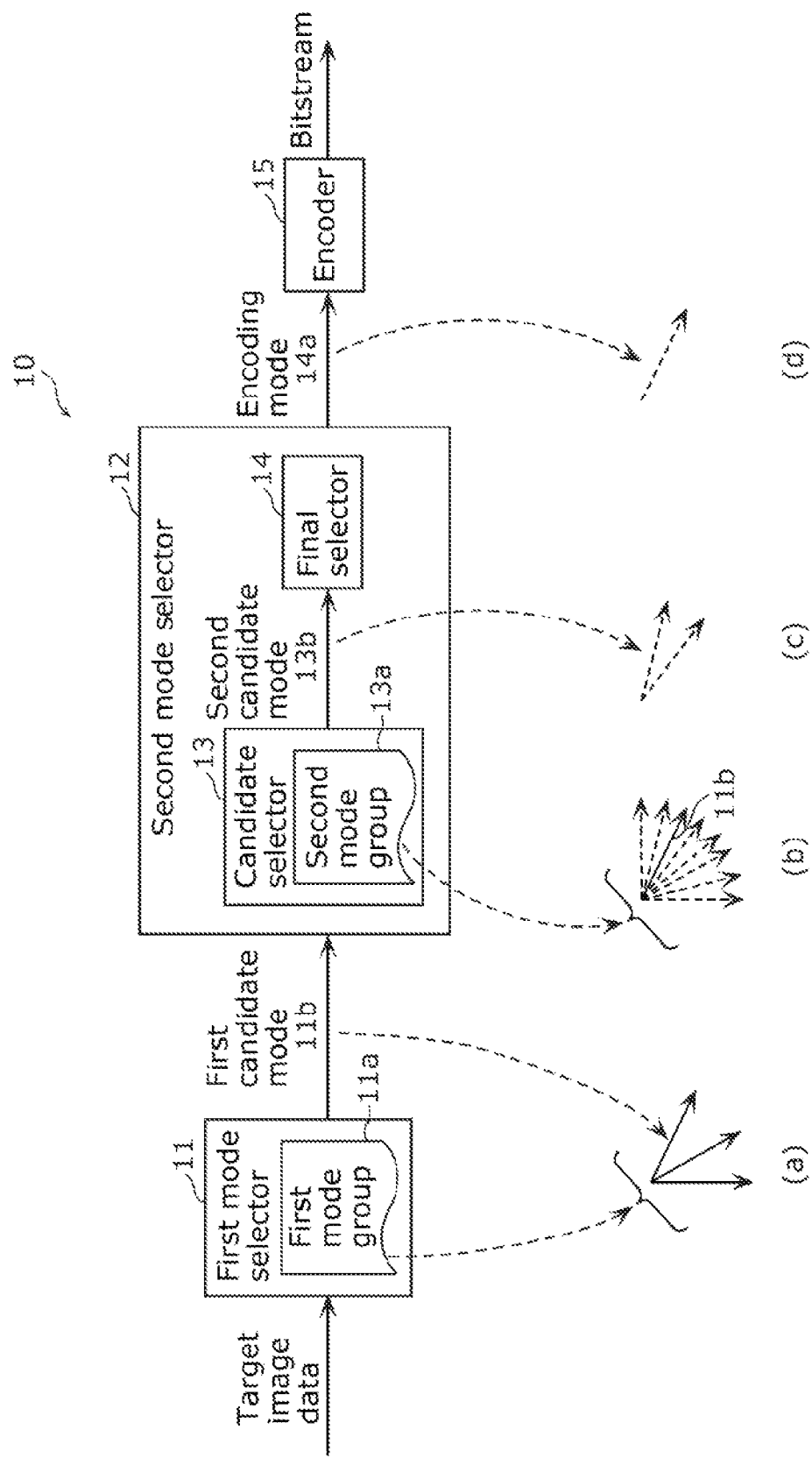
FIG. 4 is a diagram illustrating transition of the mode selected in the determination of the mode for intra prediction by the video encoding device according to Example 1.

FIG. 4 is a diagram illustrating the transition of the mode selected in determination of the mode for intra prediction by video encoding device 10 according to Example 1. (a) of FIG. 4 represents an example of first mode group 11a and first candidate mode 11b selected from first mode group 11a by first mode selector 11. (b) of FIG. 4 represents an example of first candidate mode 11b selected and second mode group 13a. (c) of FIG. 4 represents an example of second candidate mode 13b selected from second mode group 13a by candidate selector 13. (d) of FIG. 4 represents an example of encoding mode 14a selected from second candidate mode 13b by final selector 14. Hereinafter, the operation of video encoding device 10 according to Example 1 will be described for each processing unit.

Operation of First Mode Selector 11

As illustrated in FIG. 3C, in H.265, there are modes for intra prediction (mode Nos. 2 to 34) having 33 directions and modes for intra prediction with no direction, such as DC (mode No. 1) and Planar (mode No. 0). First mode selector 11 selects one mode for intra prediction as first candidate mode 11b from first mode group 11a where the modes for intra prediction in the 33 directions are defined as first mode group 11a.

In Example 1, first mode selector 11 selects the mode using a standard cost function (i.e., Cost=Distortion+λ*Rate) for rate distortion (R-D) optimization in each mode for intra prediction. Here, Distortion represents encoding distortion, and a sum of absolute difference (SAD) between the original image in an encoding block and a predicted image is used. Rate is a constant, and an encoding bit amount needed for the mode related with the mode for intra prediction is set for Rate. λ is referred to as Lagrange multiplier, and is a parameter for optimizing the encoding distortion and the bit amount. For the modes for intra prediction, first mode selector 11 calculates Costs of the encoding block in the 33 directions when the prediction processing is actually performed using adjacent pixels according to the processing content in H.265, and selects a mode for intra prediction having the smallest Cost as first candidate mode 11b.

Operation of Candidate Selector 13

As illustrated in FIG. 3E, the prediction direction in AV1 includes the modes for intra prediction having 56 directions (mode Nos. 1 to 8 and the additional angle setting) and modes for intra prediction with no direction (mode Nos. 0 and 9 to 12), such as DC/SMOOTH. The number of directions in the modes for intra prediction having directions is larger than that in H.265, and the angle and the filter calculation expression during generation of a predicted image are different from those in H.265. Accordingly, the mode selected by first mode selector 11 (i.e., first candidate mode 11b) is possibly not the optimal mode. For this reason, in second mode group 13a, candidate selector 13 selects a mode having a direction closest to that of the mode selected by first mode selector 11 and its surrounding modes as second candidate modes 13b. FIG. 3F is a diagram illustrating the correspondence between the mode for intra prediction selected by first mode selector 11 (i.e., the mode number of the mode for intra prediction in H.265) and the mode for intra prediction number in AV1 having a direction closest to that of the mode for intra prediction selected by first mode selector 11. Here, the surrounding modes refer to the modes for intra prediction in ±3 directions from the mode for intra prediction in AV1 having a direction closest to that of the mode for intra prediction in H.265. Thus, in Example 1, candidate selector 13 selects and outputs seven modes for intra prediction as second candidate modes 13b, the seven modes being the mode for intra prediction in AV1 having a direction closest to that of the mode for intra prediction in H.265 selected by first mode selector 11 (i.e., first candidate mode 11b) and the modes for intra prediction in ±3 directions from the mode for intra prediction in AV1.

For example, in the case where No. 14 (D157 in mode No. 6, additional angle of +9) in FIG. 3E is first candidate mode 11b selected by first mode selector 11, candidate selector 13 selects modes Nos. 11 to 17 for intra prediction as second candidate modes 13b. In Example 1, candidate selector 13 selects and outputs these modes Nos. 11 to 17 for intra prediction and the modes with no direction for intra prediction (mode Nos. 0 and 9 to 12), such as DC/SMOOTH, as second candidate modes 13b.

Operation of Final Selector 14

In Example 1, as in first mode selector 11, final selector 14 selects encoding mode 14a using a standard cost function (Cost=Distortion+λ*Rate) for R-D optimization in each mode for intra prediction. Specifically, for 13 modes in total of the modes for intra prediction having directions (i.e., 7 modes) and the modes for intra prediction with no direction (i.e., 6 modes) as second candidate modes 13b, final selector 14 calculates Costs thereof when the prediction processing is actually performed using adjacent pixels according to the processing content of AV1, and selects a mode for intra prediction having the smallest Cost as encoding mode 14a.

Operation of Encoder 15

Encoder 15 encodes the target image data according to encoding mode 14a selected by final selector 14.

As described above, in video encoding device 10 and the video encoding method according to Example 1 when mounted on hardware, first mode selector 11 can treat several codecs because first mode selector 11 can perform processing by any processing method without depending on the codecs with which video encoding device 10 and the video encoding method are compliant.

In the related art, final selector 14 needs evaluation of 62 modes in total of the modes for intra prediction having directions (i.e., 56 modes) and the modes for intra prediction with no direction (i.e., 6 modes). In contrast, final selector 14 in Example 1 needs evaluation of 13 modes, resulting in a significant reduction in processing. Moreover, the performance can be improved in the form of mount such that first mode selector 11 is mounted in a form required for performance (i.e., hardware or software) and second mode selector 12 (i.e., candidate selector 13 and final selector 14) is mounted in a flexible form (i.e., software).

In the case where first mode selector 11, candidate selector 13, final selector 14, and encoder 15 all are mounted as hardware, the cost can be reduced because the hardware design compliant with several codecs is not needed in first mode selector 11, which needs the largest amount of processing.

In Example 1, first mode selector 11 may not be compliant with H.265.

Second mode selector 12 may not be compliant with AV1. In other words, video encoding device 10 is not limited by an AV1 encoder.

First mode selector 11 may not use the cost function. For example, first mode selector 11 may select a mode using only the difference between the predicted image and the original image such as the sum of absolute difference (SAD) or the sum of absolute transformed differences (SATD) or the difference between the original image and the reconstructed image such as the sum of squared estimate of errors (SSE) as the index.

Alternatively, first mode selector 11 may select first candidate mode 11b by a method not performing the intra prediction processing, such as edge detection of the image (such as a Sobel filter). Furthermore, first mode selector 11 may be a mode determinator which undergoes machine learning.

Moreover, it is sufficient that first mode group 11a includes two or more directions. FIG. 3G is a diagram illustrating other examples (six examples) of first mode group 11a included in first mode selector 11 in video encoding device 10 according to the embodiment. As illustrated in the diagram, first mode group 11a may be modes having 2, 5, 9, 17, 33, or 65 directions obtained by dividing 180°.

First candidate mode 11b selected by first mode selector 11 may include not only the modes having directions, but also DC/Planar modes for H.265 as in Example 1. At this time, in the case where a DC/Planar mode for intra prediction has a significant difference in cost from that of the mode for intra prediction having a direction, candidate selector 13 may select a mode having a smaller Cost between the mode for intra prediction having a direction and the mode for intra prediction with no direction. Thus, the processing in final selector 14 can be further reduced.

First mode selector 11 may output two or more first candidate modes 11b, and may output a plurality of modes in an ascending order of Cost. In such a case, candidate selector 13 may select a mode group including the plurality of modes. For example, when first mode selector 11 selects No. 14 (D157 in mode No. 6, additional angle: +9) and No. 23 (D135 in mode No. 4, additional angle: +3) in FIG. 3E as first candidate modes 11b, candidate selector 13 may select Nos. 11 to 17 and Nos. 20 to 26 as second candidate modes 13b.

Candidate selector 13 may select one second candidate mode 13b. Although two or more modes are preferred for encoding efficiency because they increase the possibility to select a better mode, candidate selector 13 may select one mode for the purpose of reducing the processing amount. Thus, the number of modes to be selected is a trade-off, and it is desired that candidate selector 13 be implemented to satisfy the level required by the market. In this case, as encoding mode 14a, final selector 14 outputs one second candidate mode 13b selected by candidate selector 13 as it is.

Although candidate selector 13 selects candidates in the range of ±3 directions, this is only an example, and any other range can be determined. The range of candidates may be determined to any number of directions other than 3, or may be determined according to the angle, such as the number of directions included within ±22.5°.

Example 2

Next, Example 2 of the embodiment above will be described, in which video encoding device 10 and the video encoding method according to the embodiment above are used in determination of the mode for motion prediction (here, the method of specifying the reference image and the precision of the motion vector).

The motion prediction refers to inter prediction processing, which is a technique of significantly improving encoding efficiency of an inter encoding block by generating a predicted image, based on pixel data located to a position indicated by a motion vector of an image in the past or the future, and delta encoding the predicted image with respect to the target image. Here, the mode for motion prediction refers to a combination of a reference image number and a motion vector. The reference image number is an identifier indicating the image used in prediction among a plurality of images in the past or the future.

Figure 5A:
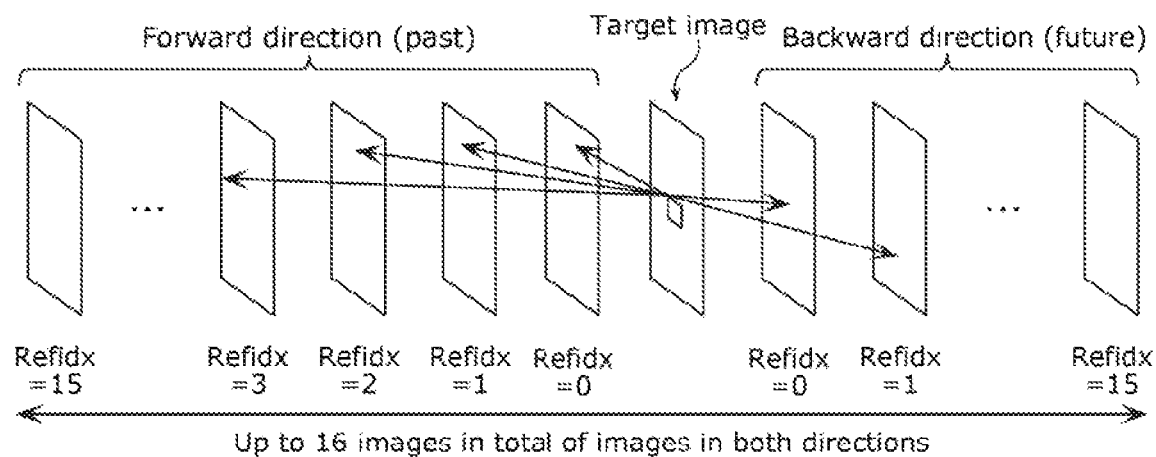
FIG. 5A is a diagram illustrating reference images in H.264 and H.265.

FIG. 5A is a diagram illustrating reference images illustrating H.264 and H.265. As illustrated in the diagram, in H.264 and H.265, prediction can be performed from both of the forward direction (the past) and the backward direction (the future) in time, and 16 reference images in total in the forward and backward directions are defined. The images do not need to be successive images in both the forward direction and the backward direction, and any image can be selected as a reference image.

Figure 5B:
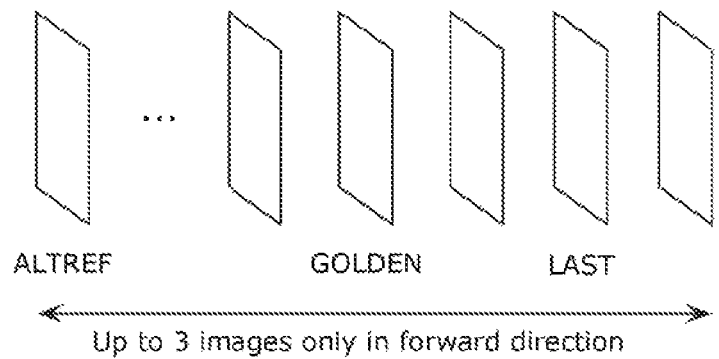
FIG. 5B is a diagram illustrating reference images in VP9.

FIG. 5B is a diagram illustrating reference images in VP9. As illustrated in the diagram, three reference images are defined only in the forward direction in a typical codec VP9, which has emerged later.

Figure 5C:
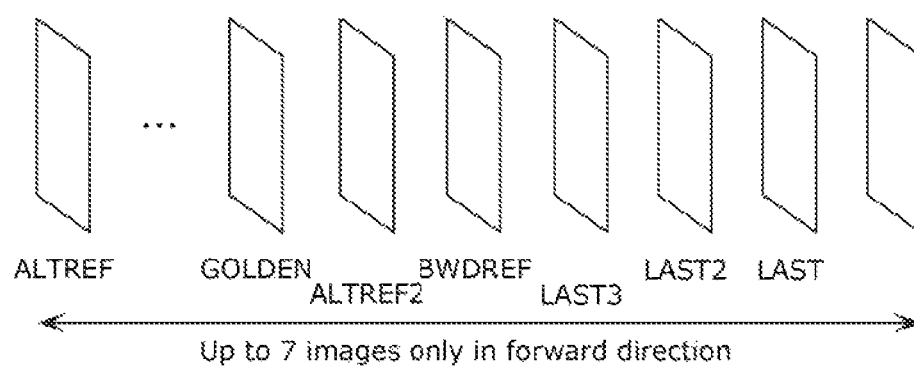
FIG. 5C is a diagram illustrating reference images in AV1.

FIG. 5C is a diagram illustrating reference images in AV1. As illustrated in the diagram, seven reference images are defined only in the forward direction in AV1. The reference images do not need to be successive images in the forward direction, and any image can be selected as a reference image.

The motion vector indicates the coordinates indicating the pixel of the image indicated by the reference image number, the pixel being used in prediction.

Figure 6A:
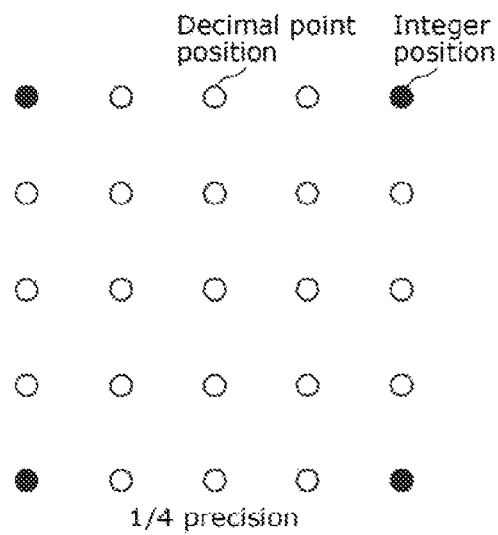
FIG. 6A is a diagram illustrating one example of the precision of the motion vector (¼ precision).
Figure 6B:
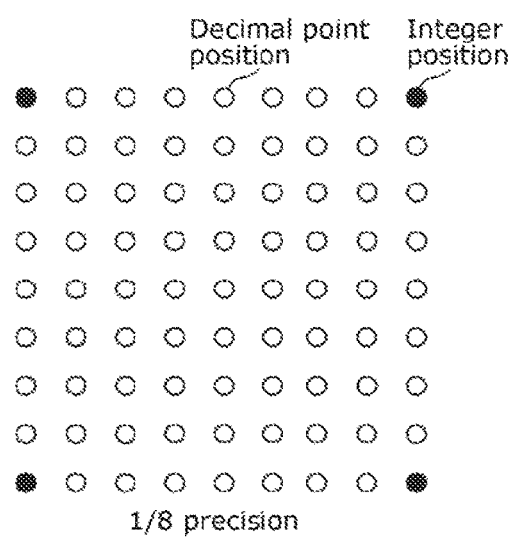
FIG. 6B is a diagram illustrating one example of the precision of the motion vector (⅛ precision).

FIG. 6A is a diagram illustrating one example of the precision of the motion vector (¼ precision). FIG. 6B is a diagram illustrating one example of the precision of the motion vector (⅛ precision). As illustrated in FIGS. 6A and 6B, the motion vector can indicate a decimal point position. In such a case, filtering is performed based on surrounding pixels in the position indicated by the motion vector to generate pixels. This decimal point precision is varied according to the codecs, ¼ precision in H.264, ¼ precision in H.265 in the next generation thereof, ⅛ precision in VP9, which is a typical codec which has emerged later, and ⅛ precision in AV1.

These codecs have different decimal point precisions and different filter calculations during generation of the predicted image.

Thus, these codecs generate different predicted images. However, the codecs share the basic idea that an image is selected from the images in the part or in the future to generate a predicted image.

In Example 2, focused on this shared feature, the determination of the mode for motion prediction is divided and processed in two stages by first mode selector 11 and second mode selector 12 (strictly, three stages by first mode selector 11, candidate selector 13, and final selector 14).

Although the processing of first mode group 11a may be any processing to search for a prediction method for generating a predicted image from the images in the past or in the future, for easiness in understanding, the processing will be described by way of an example of a processing content actually present. Specifically, in Example 2, first mode group 11a is a mode group for motion prediction defined by H.265, and second mode group 13a is a mode group for motion prediction defined by AV1. In other words, first mode selector 11 has a function to select the mode for motion prediction defined by H.265, and second mode selector 12 has a function to select the mode for motion prediction defined by AV1. Hereinafter, details of the operation of video encoding device 10 according to Example 2 will be described for each processing unit.

Operation of First Mode Selector 11

As illustrated in FIG. 5A, in H.265, motion prediction can be performed from both of the forward direction and the backward direction in time, and 16 reference images in the forward and backward directions are defined. In contrast, as illustrated in FIG. 5C, in AV1, seven reference images are defined only in the forward direction.

In Example 2, the reference relation is allowed only in the forward direction, and three immediately past images can be referred. In search for the motion vector, the motion vectors in the range of ±128 pixels in terms of integer precision are searched for.

In Example 2, first mode selector 11 selects the mode using the cost function (Cost=Distortion+λ*Rate) for R-D optimization. In other words, first mode selector 11 calculates Costs when the prediction processing is actually performed in the three reference images and the motion vectors, and selects a mode for inter prediction (reference image+ motion vector) having the smallest Cost. Here, as first candidate mode 11b, first mode selector 11 also outputs a mode for inter prediction (reference image+motion vector) of a different reference image having the second smallest Cost.

Operation of Candidate Selector 13

The motion vector in AV1 has ⅛ precision, and has different filter calculation during generation of the predicted image. Thus, the mode selected by first mode selector 11 (i.e., first candidate mode 11b) possibly is not the best although close to the best. For this reason, in second mode group 13a, candidate selector 13 selects a motion vector having a direction closet to the mode selected by first mode selector 11 and its surroundings as second candidate modes 13b.

Figure 6C:
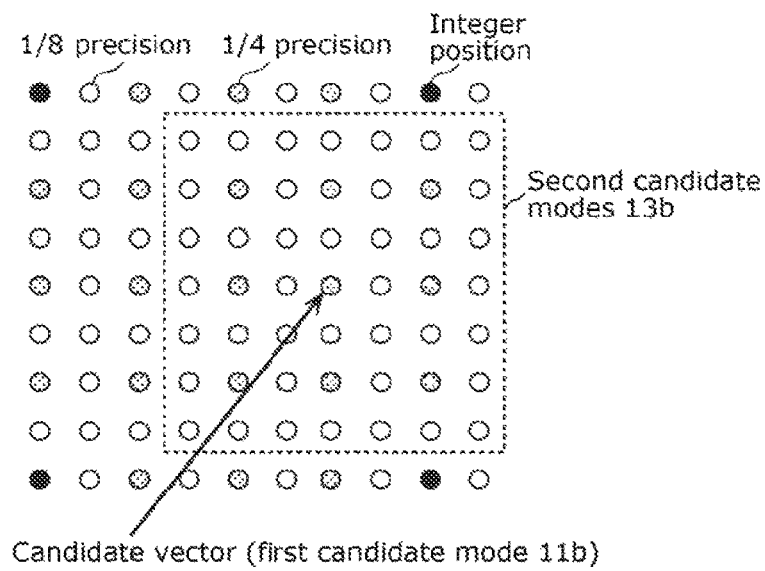
FIG. 6C is a diagram illustrating an example of the second candidate mode selected by the candidate selector in the video encoding device according to Example 2.

FIG. 6C is a diagram illustrating an example of second candidate modes 13b selected by candidate selector 13 in video encoding device 10 according to Example 2. For each of the motion vectors (first candidate modes 11b) of the reference images selected by first mode selector 11, candidate selector 13 selects motion vectors (49 points) composed of ±3 points of the surroundings of the selected motion vector at ⅛ precision as second candidate modes 13b, and outputs the motion vectors.

Operation of Final Selector 14

In Example 2, as in first mode selector 11, final selector 14 selects encoding mode 14a using the cost function (Cost=Distortion+λ*Rate) for R-D optimization. Specifically, final selector 14 calculates Costs when the prediction processing is actually performed on second candidate modes 13b, selects a mode for intra prediction having the smallest Cost, and outputs the mode as encoding mode 14a finally determined.

Operation of Encoder 15

Encoder 15 encodes the target image data according to encoding mode 14a selected by final selector 14.

As described above, in video encoding device 10 and the video encoding method according to Example 2 when mounted on hardware, first mode selector 11 can treat several codecs because first mode selector 11 can perform processing by any processing method without depending on the codecs with which video encoding device 10 and the video encoding method are compliant.

In the related art, final selector 14 needs [(the number of reference images)×(the number of motion vector search points)] (e.g., 16 images×65536±128) of evaluations. In contrast, Example 2 needs evaluations of only 2 (reference images)×49 (motion vector search points), resulting in a significant reduction in processing. Moreover, the performance can be improved in the form of mount such that first mode selector 11 is mounted in a form required for performance (i.e., hardware or software) and second mode selector 12 (i.e., candidate selector 13 and final selector 14) is mounted in a flexible form (i.e., software).

In the case where first mode selector 11, candidate selector 13, final selector 14, and encoder 15 all are mounted as hardware, the cost can be reduced because the hardware design compliant with several codecs is not needed in first mode selector 11, which needs the largest amount of processing.

First mode selector 11 may not be compliant with H.265.

Second mode selector 12 may not be compliant with AV1. In other words, video encoding device 10 is not limited by an AV1 encoder.

In other words, although in Example 2, the hardware for the standard (H.265) for ¼ precision is assumed in first mode selector 11 and the motion vector for the standard (AV1) for ⅛ precision is determined in second mode selector 12, the precision of the candidate selected by first mode selector 11 may be higher than that of the motion vector selected by second mode selector 12, for example, the motion vector for the standard for ¼ precision is finally determined by the hardware for ⅛ precision. Alternatively, an output from first mode selector 11 having a decimal point precision (such as ½ precision, ¼ precision, or ⅛ precision) may be obtained from candidates having an integer precision (such as ⅟₁ precision) in first mode selector 11, and based on the output, an output from second mode selector 12 having a decimal point precision may be obtained from candidates having an integer precision in second mode selector 12.

First mode selector 11 may not use the cost function. For example, first mode selector 11 may select a mode using only the difference between the predicted image and the original image such as the sum of absolute difference (SAD) or the sum of absolute transformed differences (SATD) or the difference between the original image and the reconstructed image such as the sum of squared estimate of errors (SSE) as the index. Moreover, first mode selector 11 may estimate a motion such as an optical flow. Furthermore, first mode selector 11 may be a mode determinator which undergoes machine learning.

The reference image may be one or three or more reference images to first candidate mode 11b selected by first mode selector 11.

First mode selector 11 may calculate two or more motion vectors (MVs). Alternatively, first mode selector 11 may output two or more modes from the best mode and candidate selector 13 may select a mode group including the two or more modes.

Alternatively, candidate selector 13 may select one motion vector. Although it is preferred for the encoding efficiency that candidate selector 13 select two or more motion vectors because they increase the possibility that final selector 14 selects the better mode, candidate selector 13 may select one mode for the purpose of reducing the processing amount. Thus, the number of modes to be selected is a trade-off, and it is desired that candidate selector 13 be implemented to satisfy the level required by the market.

Although candidate selector 13 selects 3 points in second candidate modes 13*b*, this is only an example, and any other number of points can be determined.

Although the mode for motion prediction in Example 2 is a combination of the method of specifying the reference image and the precision of the motion vector in Example 2, the mode for motion prediction may include a method of calculating cost in search of the motion vector.

In other words, in H.265, two candidate motion vectors are calculated in calculation of the cost in search of the motion vector.

Figure 7A:
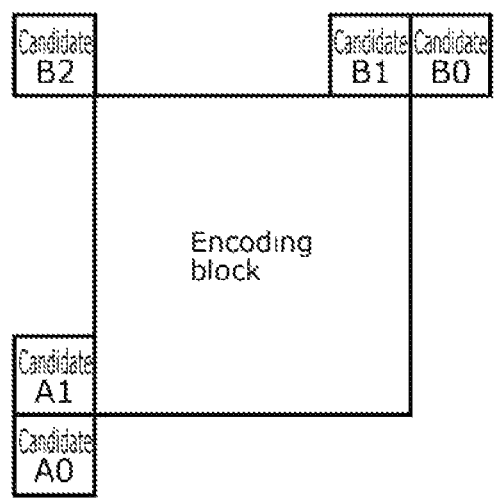
FIG. 7A is a diagram illustrating two candidate motion vectors in H.265.
Figure 7B:
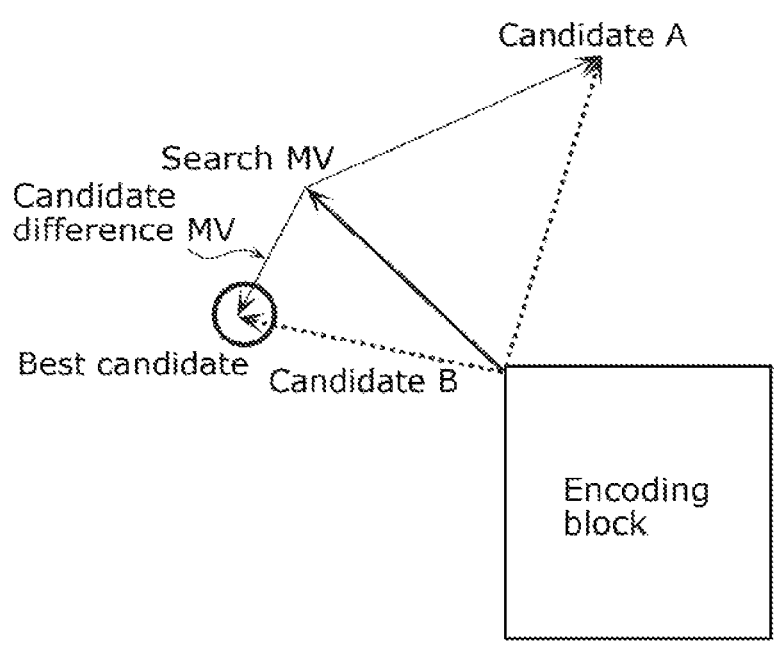
FIG. 7B is a diagram illustrating a method of calculating cost in search of the motion vector in H.265.

FIG. 7A is a diagram illustrating two candidate motion vectors in H.265. As candidate A, which is one of the two candidates, a motion vector of a non-inter block is selected from candidate blocks A0 and A1. As candidate B, which is the other of the two candidates, a motion vector of a non-inter block is selected from candidate blocks B0 to B2. FIG. 7B is a diagram illustrating a method of calculating cost in search of the motion vector in H.265. In H.265, the cost is calculated in consideration of the difference between two candidates A and B ("candidate difference MV"). In other words, the cost to search for a motion vector resulting in the smallest candidate difference is calculated.

Figures 8A, 8B:
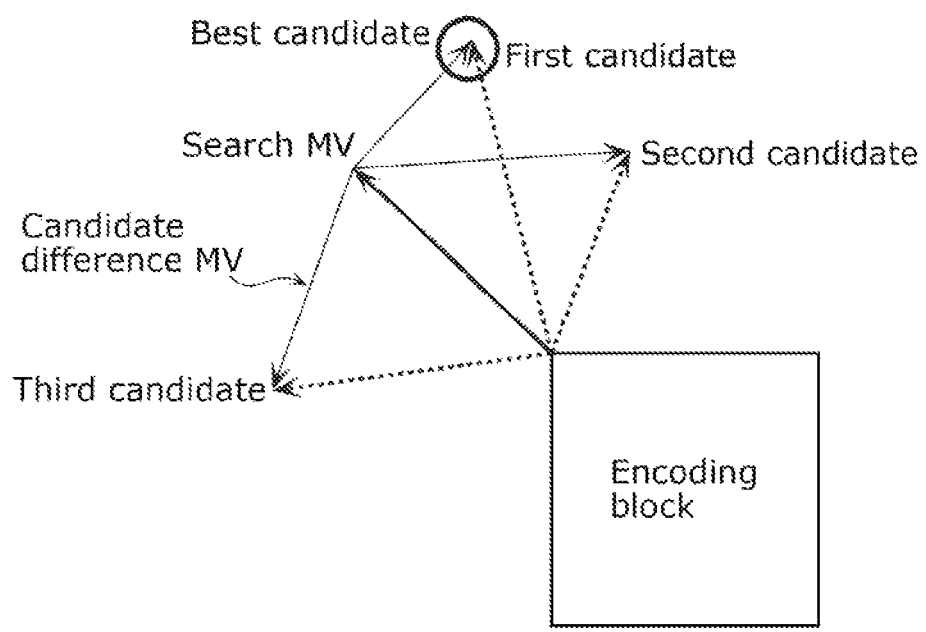
FIG. 8A is a diagram illustrating three candidate motion vectors in AV1.
FIG. 8B is a diagram illustrating a method of calculating cost in search for the motion vector in AV1.

On the other hand, in AV1, three candidate motion vectors are calculated in calculation of cost to search for the motion vector. FIG. 8A is a diagram illustrating three candidate motion vectors in AV1. Three motion vectors having the highest to third highest priorities are selected from candidate blocks 0 to 17 as the three candidates (the first candidate to the third candidate). FIG. 8B is a diagram illustrating a method of calculating cost in search for the motion vector in AV1. In AV1, the cost is calculated in consideration of the differences among three candidates, i.e., the first candidate to the third candidate ("candidate difference MV"). In other words, the cost to search for the motion vector resulting in the smallest candidate difference is calculated.

Thus, the cost to search for the motion vector is calculated by different methods according to the standard. For this reason, the method of calculating the cost to search for the motion vector may be used as one of the modes for motion prediction in Example 2 in determination of the mode by video encoding device 10 and the video encoding method according to the embodiment.

Example 3

Next, Example 3 of the embodiment above will be described, in which video encoding device 10 and the video encoding method according to the embodiment above are used in determination of the mode for the size of the encoding block (hereinafter, also simply referred to as "block").

In H.264, the block size for the intra prediction or the motion prediction is 16×16 pixels, and is fixed. The block size is extended in H.265 or the standards thereafter. The block size is up to 64×64 in H.265 and VP9, and is 128×128 in AV1. In these standards after H.265, the largest block can be divided into further smaller sizes.

Figure 9A:
FIG. 9A is a diagram illustrating the size of the encoding block in H.265.

FIG. 9A is a diagram illustrating the size of the encoding block in H.265. As illustrated in the diagram, the shape of the block in H.265 is only a square, and smaller blocks can be created. The smallest block size is 8×8. The smallest block size in selection between the mode for intra prediction and the mode for inter prediction is 8×8. The block can be further divided to the size of 4×4, and the mode for intra prediction or the mode for inter prediction can be individually specified.

Figure 9B:
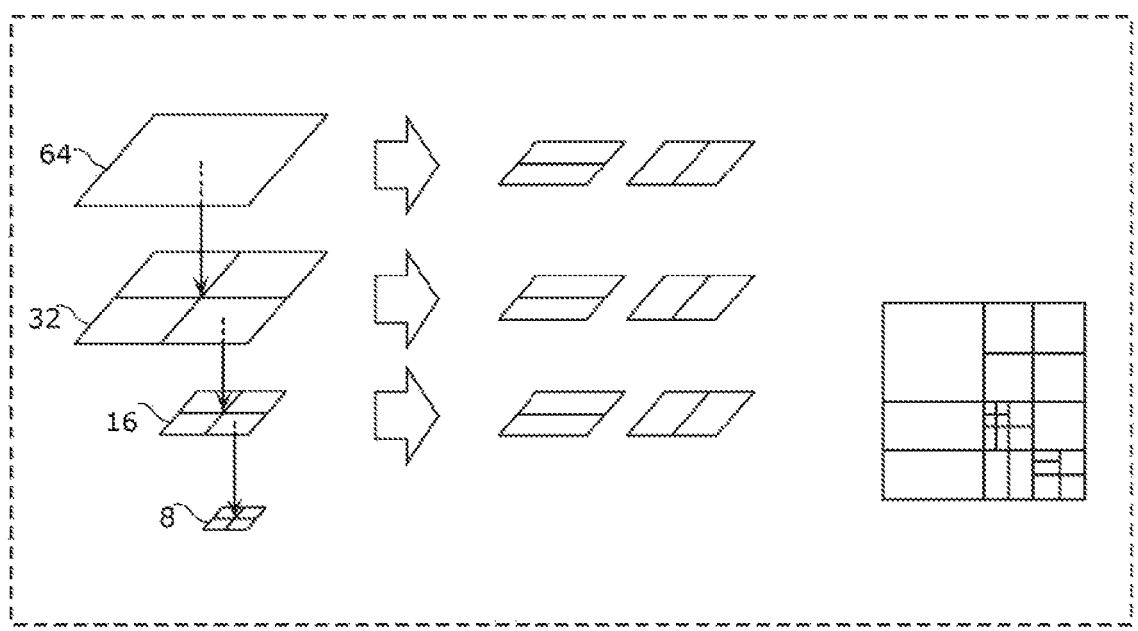
FIG. 9B is a diagram illustrating the size of the encoding block in VP9.

FIG. 9B is a diagram illustrating the size of the encoding block in VP9. As illustrated in the diagram, small blocks including rectangles can be created as blocks in VP9. The smallest block size is 8×8.

FIG. 9C is a diagram illustrating the size of the encoding block in AV1. In AV1, more various combinations of blocks can be created. The smallest block size is 4×4.

The block size is different among these codecs and the mode for intra prediction is different among the standards. Thus, different predicted images are generated among the standards. However, the standards share the basic idea that one mode for intra prediction is selected in encoding block unit.

In Example 3, focusing on this shared feature, determination of the size of the encoding block is divided and processed in two stages by first mode selector 11 and second mode selector 12 (strictly, three stages by first mode selector 11, candidate selector 13, and final selector 14).

Although the processing of first mode group 11*a* may be any processing to search for the optimal size of the encoding block, for easiness in understanding, the processing will be described by way of an example of a processing content actually present. In Example 3, the processing in an intra frame will be described.

In Example 3, first mode group 11*a* is the encoding block size group defined by H.265, and second mode group 13*a* is the encoding block size group defined by AV1. In other words, first mode selector 11 has a function to select the size of the encoding block defined by H.265, and second mode selector 12 has a function to select the size of the encoding block defined by AV1. Hereinafter, details of the operation of video encoding device 10 according to Example 3 will be described for each processing unit.

Operation of First Mode Selector 11

As illustrated in FIG. 9A, the size of the encoding block ranges from 64×64 to 8×8 in H.265. As illustrated in FIG. 3C, the mode for intra prediction in H.265 includes modes for intra prediction (mode Nos. 2 to 34) having 33 directions and modes for intra prediction with no direction, such as DC (mode No. 1)/Planar (mode No. 0).

In Example 3, first mode selector 11 selects a mode for size of the encoding block using a standard cost function (Cost=Distortion+λ*Rate) for R-D optimization in each mode for intra prediction. Specifically, for the modes for intra prediction (35 modes), first mode selector 11 calculates Costs of the encoding blocks when the prediction processing is actually performed using adjacent pixels according to the processing content in H.265, and selects the mode for intra prediction having the smallest Cost as the optimal Cost in the encoding block size. This processing is performed on all the encoding block sizes from 64×64 to 8×8.

The encoding block size is then determined by comparison among the Costs of the encoding block sizes. In other words, first mode selector 11 compares the Costs between the case where four encoding block sizes of 8×8 are selected and the case where an encoding block size of 16×16 is selected, and then compares the Costs between the case where the smaller Cost is selected and the case where an encoding block size of 32×32 is selected. First mode selector 11 then compares the Costs between the case where the smaller Cost is selected and the case where an encoding block size of 64×64 is selected, and selects the smaller Cost.

Thereby, the optimal size of the encoding block is determined. The determined size of the encoding block is selected as first candidate mode 11b.

Operation of Candidate Selector 13

As illustrated in FIG. 9C, the size of the encoding block in AV1 ranges from 128×128 to 4×4. The mode selected by first mode selector 11 (i.e., first candidate mode 11b) possibly is not the optimal mode for AV1. For this reason, in second mode group 13a, candidate selector 13 selects a mode having a direction closest to that of the mode selected by first mode selector 11 and its surrounding modes as second candidate modes 13b.

Figure 10:
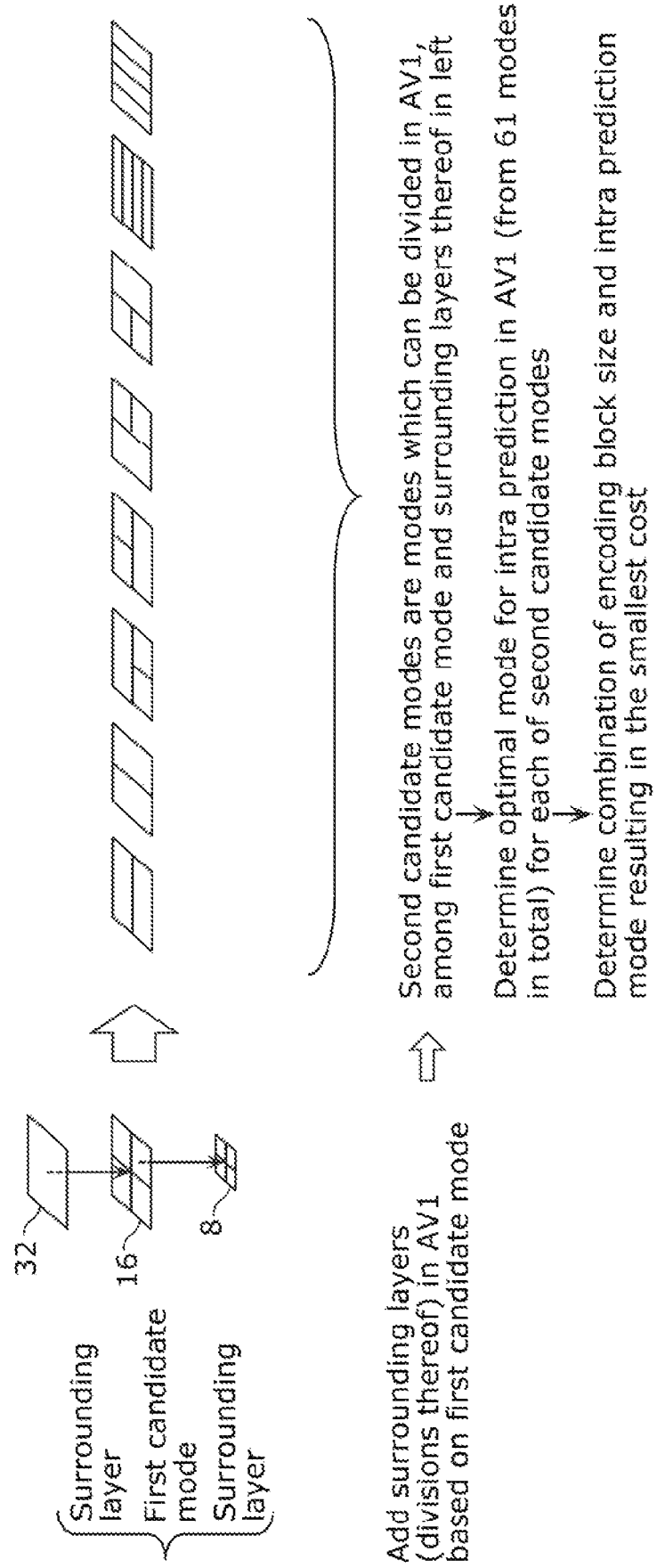
FIG. 10 is a diagram illustrating an example of the second candidate mode selected by the candidate selector in the video encoding device according to Example 3.

FIG. 10 is a diagram illustrating an example of second candidate mode 13b selected by candidate selector 13 in video encoding device 10 according to Example 3. As illustrated in the diagram, candidate selector 13 selects modes including one immediately upper layer and one immediately lower layer of the candidate mode as the surrounding modes. The encoding block in AV1 includes rectangular blocks. Thus, such rectangular blocks are also included in the mode to be selected.

Operation of Final Selector 14

In Example 3, as in first mode selector 11, final selector 14 selects the mode for the size of the encoding block using the standard cost function (Cost=Distortion+λ*Rate) for R-D optimization in each mode for intra prediction.

As illustrated in FIG. 3E, the prediction direction in AV1 includes modes for intra prediction having 56 directions (mode Nos. 1 to 8+additional angle setting) and modes for intra prediction with no direction (mode Nos. 0 and 9 to 12), such as DC/SMOOTH.

Final selector 14 calculates Costs of the encoding blocks when prediction processing (61 modes in total) is performed on the immediately one upper layer and the immediately one lower layer of the size, which are second candidate modes 13b, according to the processing content in AV1, and selects the mode for intra prediction having the smallest Cost as encoding mode 14a.

Specifically, final selector 14 compares the Costs of the encoding block sizes to determine the encoding block size. The Cost of the block size not calculated is preliminarily determined as MAX (maximum value). Final selector 14 then compares the Cost between the case where four encoding block sizes of 8×8 are selected and the case where an encoding block size of 16×16 is selected, and compares the Cost between the case where the smaller Cost is selected and the case where an encoding block size of 32×32 is selected. Final selector 14 then compares the Cost between the case where the smaller Cost is selected and the case where an encoding block size of 64×64 is selected, and selects the smaller Cost to determine the optimal encoding block size. Final selector 14 outputs the determined size of the encoding block as encoding mode 14a finally determined.

Operation of Encoder 15

Encoder 15 encodes the target image data according to encoding mode 14a selected by final selector 14.

As described above, in video encoding device 10 and the video encoding method according to Example 3 when mounted on hardware, first mode selector 11 can treat several codecs because first mode selector 11 can perform processing by any processing method without depending on the codecs with which video encoding device 10 and the video encoding method are compliant.

In the related art, final selector 14 needs evaluations of 4421 modes of encoding block sizes ranging from 128×128 to 4×4. In contrast, Example 3 needs evaluations of 1872 modes, resulting in a significant reduction in processing.

Moreover, the performance can be improved in the form of mount such that first mode selector 11 is mounted in a form required for performance (i.e., hardware or software) and second mode selector 12 (i.e., candidate selector 13 and final selector 14) is mounted in a flexible form (i.e., software).

In the case where first mode selector 11, candidate selector 13, final selector 14, and encoder 15 all are mounted as hardware, the cost can be reduced because the hardware design compliant with several codecs is not needed in first mode selector 11, which needs the largest amount of processing.

First mode selector 11 may not be compliant with H.265.

Second mode selector 12 may not be compliant with AV1. In other words, video encoding device 10 is not limited by an AV1 encoder.

First mode selector 11 may not use the cost function. For example, first mode selector 11 may select a mode using only the difference between the predicted image and the original image such as the sum of absolute difference (SAD) or the sum of absolute transformed differences (SATD) or the difference between the original image and the reconstructed image such as the sum of squared estimate of errors (SSE) as the index.

Alternatively, first mode selector 11 may select first candidate mode 11b by a method without intra prediction, for example, by determining the encoding block size such that the variance of the image is smaller.

First mode selector 11 may be a mode determinator which undergoes machine learning.

It is sufficient that first mode group 11a includes two or more encoding block sizes. At this time, the shape of the encoding block is desirably a combination of a square and a rectangle.

Candidate selector 13 may select one second candidate mode 13b. Although two or more modes are preferred for encoding efficiency because they increase the possibility to select a better mode, candidate selector 13 may select one mode for the purpose of reducing the processing amount. Thus, the number of modes to be selected is a trade-off, and it is desired that candidate selector 13 be implemented to satisfy the level required by the market.

Although candidate selector 13 selects one immediately upper layer and one immediately lower layer of second candidate mode 13b, this is only an example, and any other configuration may be used.

Search does not need to be performed on all the rectangular encoding blocks. For example, all the encoding blocks in upper layers may be searched for, and only square encoding blocks in lower layers may be searched for.

Thus, the video encoding method and the video encoding device according to the present disclosure have been described based on the embodiment and Examples 1 to 3, but the embodiment and Examples 1 to 3 should not be construed as limitations to the present disclosure. The present disclosure also covers embodiments including a variety of modifications of the embodiment and Examples 1 to 3 made by persons skilled in the art without departing the gist of the present disclosure and other embodiments including combinations of parts of the components included in the embodiment and Examples 1 to 3.

Although only one exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure can be used as a video encoding method and a video encoding device, and particularly, as a video encoding device having an architecture which enables remodeling of the video encoding device in reduced amounts of cost and time to be compliant with a new standard, such as an encoder and a codec implemented by a semiconductor integrated circuit.

The invention claimed is:

1. A video encoding method, comprising: (A) selecting at least one mode as a first candidate mode from a predetermined first mode group for encoding a video; (B) selecting one mode as an encoding mode from a predetermined second mode group, based on the first candidate mode selected; and (C) encoding the video in the encoding mode selected, wherein the predetermined first mode group is defined by a first video codec standard, the predetermined second mode group is defined by a second video codec standard different from the first video codec standard, and the predetermined first mode group includes modes which do not belong to the predetermined second mode group.

2. The video encoding method according to claim 1, wherein (A) is executed by a first electronic circuit not including a processor, and (B) is executed by a second electronic circuit including a processor.

3. The video encoding method according to claim 2, wherein the first electronic circuit and the second electronic circuit are mounted on different semiconductor substrates.

4. The video encoding method according to claim 1, wherein (B) includes: (B-1) selecting at least one mode as a second candidate mode from the predetermined second mode group, based on the first candidate mode selected in (A); and (B-2) selecting the encoding mode from the second candidate mode selected in (B-1).

5. The video encoding method according to claim 4, wherein in (A), the first candidate mode is selected by calculating costs of modes included in the predetermined first mode group, and preferentially selecting a mode having a smaller cost, in (B-1), the second candidate mode is selected by selecting at least a mode closer to the first candidate mode from the predetermined second mode group, the first candidate mode being selected in (A), and in (B-2), the encoding mode is selected by calculating costs of modes selected in (B-1) and included in the second candidate mode, and preferentially selecting a mode having a smaller cost.

6. The video encoding method according to claim 1, wherein a total number of modes included in the predetermined first mode group is smaller than a total number of modes included in the predetermined second mode group.

7. A video encoding method, comprising: (A) selecting at least one mode as a first candidate mode from a predetermined first mode group for encoding a video; (B) selecting one mode as an encoding mode from a predetermined second mode group, based on the first candidate mode selected; and (C) encoding the video in the encoding mode selected, wherein the predetermined first mode group is defined by a first video codec standard, the predetermined second mode group is defined by a second video codec standard different from the first video codec standard, and the predetermined first mode group and the predetermined second mode group are each a collection of modes for intra prediction.

8. The video encoding method according to claim 1, wherein the predetermined first mode group and the predetermined second mode group are each a collection of modes for motion prediction.

9. The video encoding method according to claim 8, wherein each of the modes for motion prediction is defined by at least one of a method of specifying a reference image or a method of specifying precision of a motion vector.

10. The video encoding method according to claim 1, wherein the predetermined first mode group and the predetermined second mode group are each a collection of modes for a size of an encoding block.

11. A video encoding device, comprising:
a first mode selector which selects at least one mode as a first candidate mode from a predetermined first mode group for encoding a video; a second mode selector which selects one mode as an encoding mode from a predetermined second mode group, based on the first candidate mode selected; and
an encoder which encodes the video in the encoding mode selected, wherein the predetermined first mode group is defined by a first video codec standard, the predetermined second mode group is defined by a second video codec standard different from the first video codec standard, and the predetermined first mode group includes modes which do not belong to the predetermined second mode group.

12. The video encoding device according to claim 11, wherein the first mode selector is a first electronic circuit not including a processor, and the second mode selector is a second electronic circuit including a processor.

13. The video encoding device according to claim 12, wherein the first electronic circuit and the second electronic circuit are mounted on different semiconductor substrates.

14. A video encoding device, comprising: a first mode selector which selects at least one mode as a first candidate mode from a predetermined first mode group for encoding a video; a second mode selector which selects one mode as an encoding mode from a predetermined second mode group, based on the first candidate mode selected; and an encoder which encodes the video in the encoding mode selected, wherein the predetermined first mode group is defined by a first video codec standard, the predetermined second mode group is defined by a second video codec standard different from the first video codec standard, and the predetermined first mode group and the predetermined second mode group are each a collection of modes for intra prediction.

* * * * *